Figure 1:
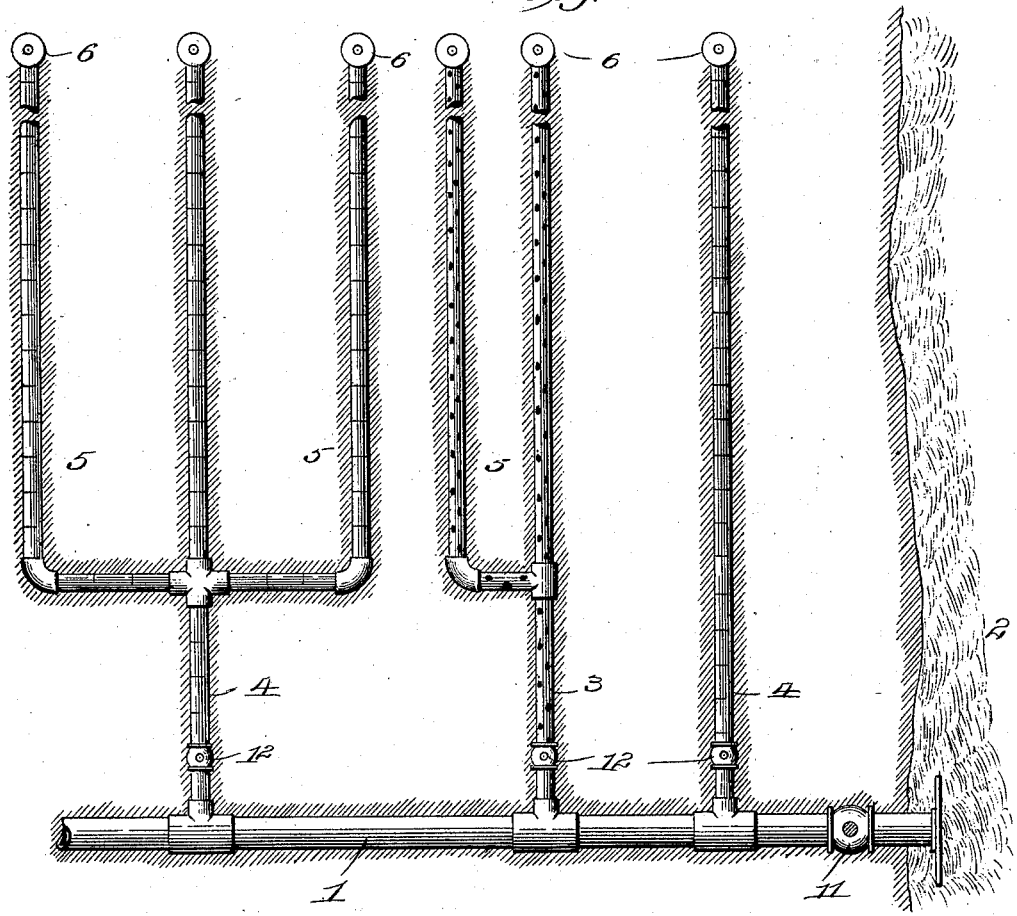

(No Model.)

J. N. SWANSON.
UNDERGROUND IRRIGATION.

No. 585,856. Patented July 6, 1897.

WITNESSES:
Harry S. Rohrer,
K. A. Nau

INVENTOR
John N. Swanson,
BY John Wedderburn,
his ATTORNEY.

UNITED STATES PATENT OFFICE.

JOHN N. SWANSON, OF CHICAGO, ILLINOIS.

UNDERGROUND IRRIGATION.

SPECIFICATION forming part of Letters Patent No. 585,856, dated July 6, 1897.

Application filed June 1, 1896. Serial No. 593,863. (No model.)

*To all whom it may concern:*

Be it known that I, JOHN N. SWANSON, a citizen of the United States, residing at Chicago, in the county of Cook and State of Illinois, have invented certain new and useful Improvements in Underground Irrigations; and I do hereby declare the following to be a full, clear, and exact description of the invention, such as will enable others skilled in the art to which it appertains to make and use the same.

My invention has reference to a system of irrigation, the object of the same being to furnish an uninterrupted supply of water to the soil from a point beneath the surface which will give the soil an opportunity to properly receive the water, which will afterward be reached by the roots of the growing crop and give sustenance to the plant. The principal objections to the old systems of surface irrigation is that too much land throughout a field is occupied by canals and waterways, which prevent rapid farming. With my irrigating system a field can be uninterruptedly farmed from one end to the other, thereby utilizing the entire surface of the soil and saving much time in cultivation.

The invention consists in distributing ordinary drainage-tile or perforated gas-pipes throughout a field beneath its surface at such distances apart and at such depth as the character of the soil and experience shall dictate. Water is supplied from natural sources, as canal, river, pond, or tank, and is allowed to flow through the underground conduits by natural pressure. Should the field to be irrigated, however, be hilly and not convenient to secure natural pressure, I may utilize steam or other power to force the water to the highest point in my system of pipes. In such case I will cement each joint of the tile used and allow the water to escape through the tile itself, the same being sufficiently porous for that purpose.

Under my system of irrigation the same can be in operation during the winter months as well as during the summer, thus giving the ground the same benefit as that caused by heavy snows and rains during the winter. It will practically turn the ground over to the farmer in the same shape for good spring work as that produced from natural causes. By thoroughly soaking the ground during the winter very little irrigation will be required until later in the season, after the farmer has had an opportunity to attend to his sowing. When this has been done, the water can be turned on through the system of pipes and regulated as to the quantity of its flow according to the demands of the growing crop, in no way interfering with the care of the same.

The invention is clearly illustrated in the accompanying drawings, in which—

Figure 2:
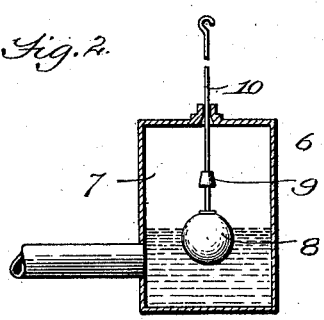
Figure 3:
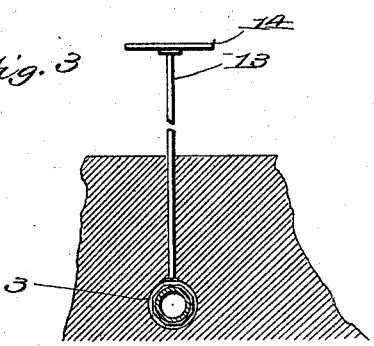

Figure 1 shows the general plan of laying my underground conduits, and Fig. 2 is a sectional detail view of a vent employed at the end of each set of pipes. Fig. 3 is a sectional view showing one of the cut-offs in the supply-pipes with the operating-handle projecting upwardly therefrom.

Like reference-numerals indicate like parts in the different views.

In the drawings I have shown in one system of pipes the ordinary drainage-tile and in the other perforated gas-pipe. 1 represents the main supply-pipe, which communicates with the source of water-supply 2 by any suitable means. The pipe 1 is preferably led along the end of the field a short distance beneath the surface of the ground and leading outwardly therefrom are a series of distributing-pipes 3 3 and 4 4. The pipes 3 are made up of perforated metallic tubing and the pipes 4 of ordinary drainage-tile. These extend throughout the length of the field and may be provided at intervals with branches 5, as clearly shown. At the end of each of the pipes 3, 4, and 5 is attached a self-regulating vent 6. (Shown in detail in Fig. 2.) This vent is made up of a chamber 7, float 8, and valve 9, and a rod 10, leading upwardly through the top of the chamber 7, by means of which it may be operated by hand from the surface of the ground. The water passing through the pipes 3, 4, and 5 and entering the chamber 7 causes the float 8 to rise, carrying with it the valve 9, which cuts off the escape of the water through the top of the chamber 7. The position of the rod 10 will indicate to the farmer the presence or absence of water in the pipes 3 4 5.

In connection with the above system of piping I employ a series of cut-offs 11 12, which are provided with arms 13, extending to a point above the surface, which arms have handles 14 thereon, by means of which the cut-offs may be operated from the surface. The cut-off 11 in the main supply-pipe enables the operator to cut off the entire supply of water from the system. The cut-offs 12 in the pipes 3 4 5 enable the operator to cut off the supply of water from these pipes and all their branches.

Having now described my invention, what I claim as new, and desire to secure by Letters Patent, is—

1. The combination with a source of water-supply of a main supply-pipe connected therewith and located beneath the surface of the ground, a series of perforated or porous branch pipes leading outwardly therefrom, cut-offs in said pipes and an automatically-actuated vent-chamber and indicator connected to the outer end of each of said pipes, substantially as and for the purpose described.

2. The combination with a pipe located beneath the surface of the ground of a vent-chamber into which said pipe leads and having an extension leading to the surface of the ground, having an opening in its upper end a float in said chamber, a valve carried by said float adapted to fit within said opening and an arm extending upwardly through said extension and constituting an indicator, substantially as and for the purpose described.

In testimony whereof I have signed this specification in the presence of two subscribing witnesses.

JOHN N. SWANSON.

Witnesses:
G. F. JONES,
J. L. TURNER.